United States Patent
Stine

(10) Patent No.: US 8,162,704 B2
(45) Date of Patent: Apr. 24, 2012

(54) AMPHIBIOUS VEHICLE AND ENGINE POWER CONTROL

(75) Inventor: Bradley L. Stine, Columbus, IN (US)

(73) Assignee: Allison Transmission, Inc., Indianapolis, IN (US)

(*) Notice: Subject to any disclaimer, the term of this patent is extended or adjusted under 35 U.S.C. 154(b) by 356 days.

(21) Appl. No.: 12/560,716

(22) Filed: Sep. 16, 2009

(65) Prior Publication Data

US 2010/0173542 A1 Jul. 8, 2010

Related U.S. Application Data

(60) Provisional application No. 61/105,499, filed on Oct. 15, 2008.

(51) Int. Cl.
*B63H 21/22* (2006.01)
(52) U.S. Cl. ............................ 440/1; 440/12.5; 440/84
(58) Field of Classification Search ............. 440/1, 12.5, 440/84
See application file for complete search history.

(56) References Cited

U.S. PATENT DOCUMENTS

| 5,562,066 | A | * | 10/1996 | Gere et al. | 440/12.51 |
|---|---|---|---|---|---|
| 5,590,617 | A | * | 1/1997 | Gere et al. | 440/12.51 |
| 6,881,107 | B2 | | 4/2005 | Roycroft | |
| 7,207,851 | B1 | * | 4/2007 | Gibbs et al. | 440/1 |
| 7,438,611 | B2 | | 10/2008 | Gibbs | |
| 2005/0239351 | A1 | * | 10/2005 | Darby et al. | 440/12.51 |
| 2008/0299844 | A1 | | 12/2008 | Longdill et al. | |
| 2009/0004931 | A1 | | 1/2009 | Gibbs | |
| 2009/0004932 | A1 | | 1/2009 | Jeffery et al. | |
| 2009/0156069 | A1 | | 6/2009 | Hewitt | |
| 2009/0186535 | A1 | | 7/2009 | Sullivan | |

\* cited by examiner

*Primary Examiner* — Stephen Avila
(74) *Attorney, Agent, or Firm* — Barnes & Thornburg LLP

(57) ABSTRACT

Amphibious vehicles, control modules, and methods are disclosed in which engine output power is adjusted based upon whether an amphibious vehicle is traversing land or is not traversing land. Some embodiments determine whether the amphibious vehicle is traversing land based upon a speed differential between an engine speed of the vehicle and a turbine speed of the torque converter contained within the power transfer module/transmission assembly.

20 Claims, 6 Drawing Sheets

AMPHIBIOUS VEHICLE AND ENGINE POWER CONTROL

CROSS-REFERENCE

This application claims the benefit of U.S. Provisional Patent Application Ser. No. 61/105,499, filed Oct. 15, 2008, which is hereby incorporated herein by reference in its entirety.

GOVERNMENTAL NOTICE

This document may contain technical data subject to the international traffic in arms regulation (ITAR) 22 CFR 120-130.

BACKGROUND

The Expeditionary Fighting Vehicle (EFV) is an armored amphibious vehicle capable of transporting troops from ships to inland objectives. The EFV includes tracks to propel the vehicle over land and water jets to propel the vehicle over water. The EFV provides operator controls which permit an operator of the EFV to manually select from a water mode, a transition mode, and a land mode of operation. In water mode, the engine produces water power to drive turbines of the water jets and propel the vehicle across water. In land mode, the engine produces land power to drive tracks and propel the vehicle over land. Further, in transition mode, the engine produces transition power to power (i) both tracks and water jets, (ii) tracks only, or (iii) water jets only as the vehicle transitions between land and water.

In one embodiment, the engine produced water power (e.g. 2700 Hp) and transition power (e.g. 1600 Hp) are both substantially greater than the land power (e.g. 850 Hp). During normal operation, the operator of the amphibious vehicle places the vehicle in a transition mode as the vehicle is approaching land and manually selects land mode upon the vehicle reaching land. However, if the operator does not manually select land mode when the vehicle transitions from water to land, the engine produced transition power exerts torque upon the transmission and components of the land propulsion assembly for which the transmission and components were not designed. Thus, continued production of transition power while the vehicle is traveling over land may result in failure of the transmission and/or land propulsion assembly due to the excess delivered power.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DESCRIPTION OF THE PREFERRED EMBODIMENT

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
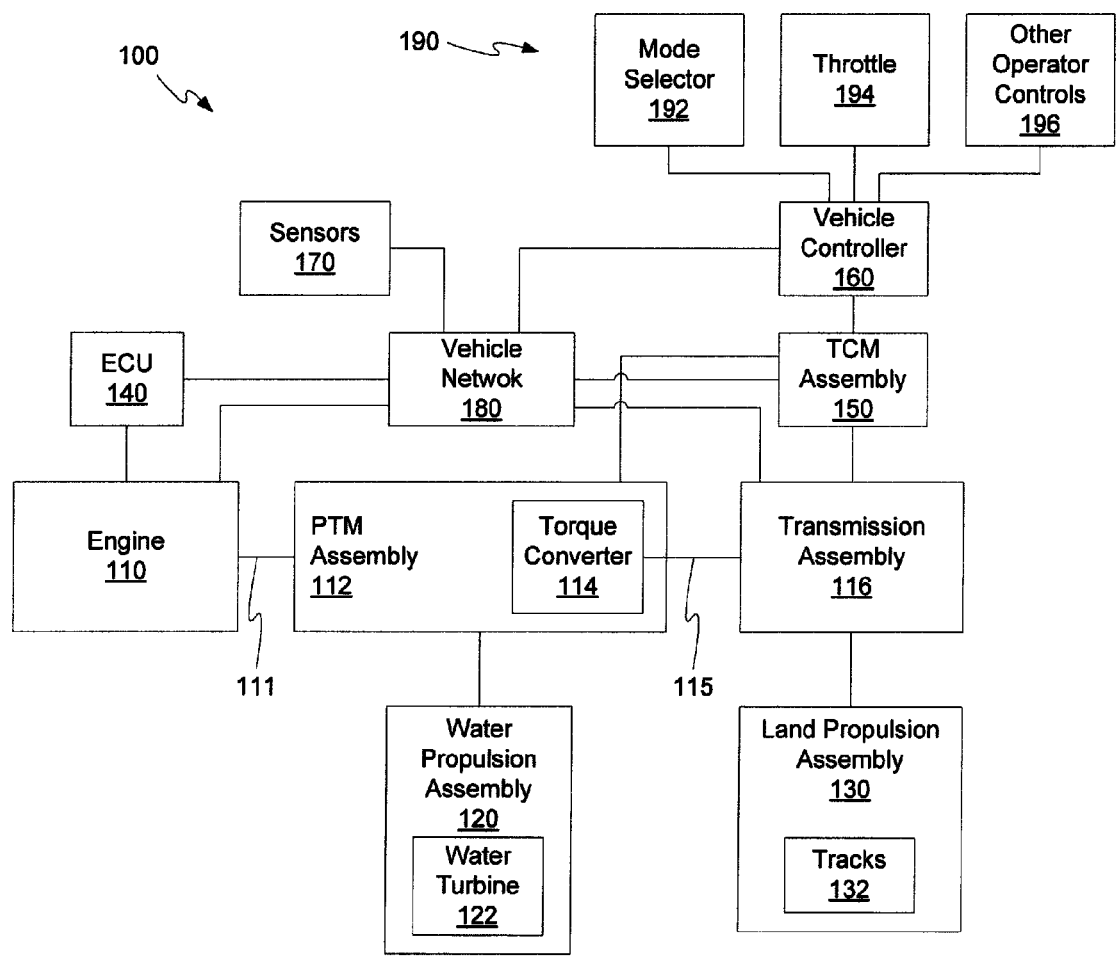
FIG. 1 shows an embodiment of an amphibious vehicle having a water propulsion assembly and a land propulsion assembly.

Referring now to FIG. 1, an amphibious vehicle 100 is shown. The amphibious vehicle 100 includes a power transfer module assembly 112 coupled to an engine 110 via a shaft 111. The amphibious vehicle 100 further includes a transmission assembly 116 coupled to a torque converter 114 of the power transfer module assembly 112 via a drive shaft 115. The engine 110 drives a water propulsion assembly 120 of the vehicle 100 via the power transfer module assembly 112 and a land propulsion assembly 130 via the power transfer module assembly 112 and the transmission assembly 116. In one embodiment, the water propulsion assembly 120 comprises water turbine(s) 122 that drive water jets used to propel the amphibious vehicle 100 across a body of water and the land propulsion assembly 130 comprises continuous tracks 132 to propel the amphibious vehicle 100 over land. In other embodiments, the propulsion assemblies 120, 130 may include other types of drive assemblies such as drive wheels, propellers, and the like.

As shown, the amphibious vehicle 100 may further include an engine control unit 140, a transmission control module 150, a vehicle controller 160, sensors 170, and vehicle network 180. In one embodiment the vehicle network 180 includes one or more automotive networks such as a Controller Area Network (CAN) bus, a FlexCAN bus, a Local Interconnect Network (LIN) bus, a GMLAN bus, and/or a FlexRay bus. However, other networks besides those commonly found in automotive environments may also be used.

The engine control unit 140 may be coupled to the engine 110 to receive signals indicative of various operating parameters of the engine 110. The engine control unit 140 may also provide the engine 110 with various control signals used to configure and to control the operation of the engine 110. In particular, the engine control unit 140 may be coupled to the engine 110 via the vehicle network 180 to receive signals indicative of the engine's operation and to provide control signals to control the operation of the engine 110. The engine control unit 140 may also be directly wired to various sensors 170 and/or components of the engine 110 to permit direct monitoring and control of such aspects of the engine 110.

Similarly, the transmission control module 150 may be coupled to the transmission 116 to receive signals indicative of various operating parameters of the transmission 116. The transmission control module 150 may further provide the transmission 116 with various control signals used to configure and to control the operation of the transmission 116. In particular, the transmission control module 150 may be coupled to the transmission 116 via the vehicle network 180 to receive signals indicative of the transmission's operation and to provide control signals to control the operation of the transmission 116. The transmission control module 150 may also be directly wired to various sensors 170 and/or components of the transmission 116 to permit direct monitoring and control of such aspects of the transmission 116.

The vehicle controller 160 may be coupled to the operator controls 190 to receive requests from the operator of the amphibious vehicle and to provide signals indicative of the operation of the vehicle 100. The vehicle controller 160 may be further coupled to the vehicle network 180 in order to receive signals from and send signals to the engine 110, the engine control unit 140, the transmission 116, the transmission control module 150, and the sensors 170. The vehicle controller 160 may also be directly wired to various sensors and/or components of the vehicle 100 to permit direct monitoring and control of such aspects of the vehicle 100.

As shown, the operator controls 190 may include mode selectors 192, a throttle 194, and other controls 196 such as, for example, levers, switches, pedals, buttons, wheels, lights, dials, etc. which an operator of the amphibious vehicle 100 may actuate in order to control operation of the amphibious vehicle 100 and which an operator may monitor in order to confirm operation of the amphibious vehicle 100. In one embodiment, the operator controls 190 generate one or more signals which are received by the vehicle controller 160 to request the vehicle controller 160 to perform corresponding actions.

Figure 2:
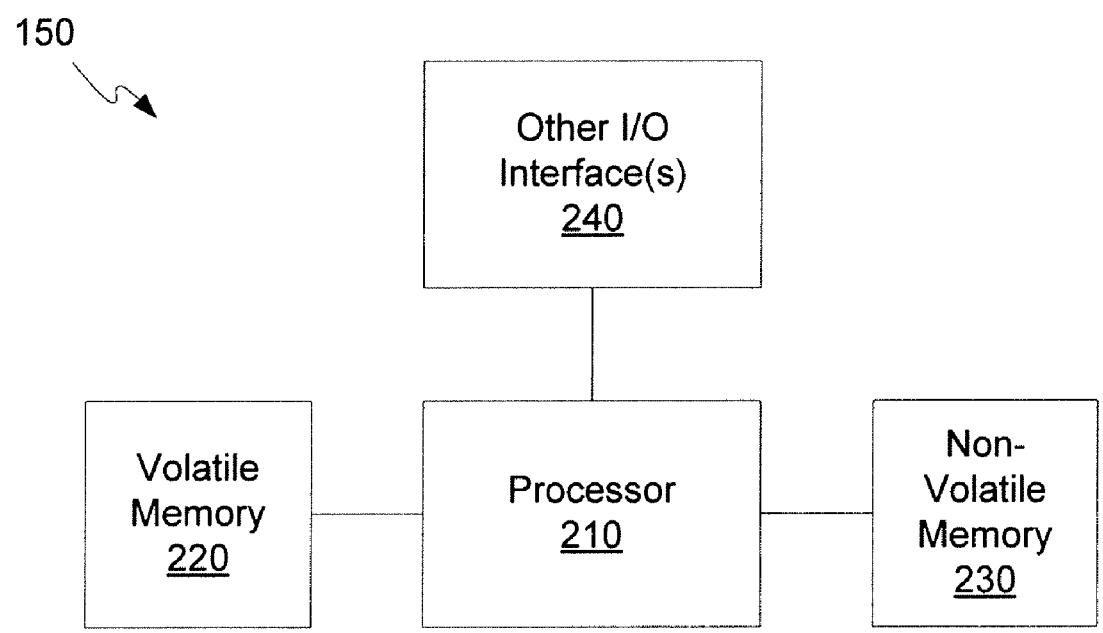
FIG. 2 shows an embodiment of a transmission control module suitable for the vehicle of FIG. 1.

The engine control unit 140, the transmission control module 150, and the vehicle controller 160 may each include various analog and/or digital circuit components which cooperate to control the various aspects of the amphibious vehicle 110. FIG. 2 shows an embodiment of the transmission control module 150. However, the engine control unit 140 and the vehicle controller 160 may also be implemented in a manner similar to the embodiment of the transmission control module 150 shown in FIG. 2.

As shown, the transmission control module 150 may include a processor 210, volatile memory 220, non-volatile memory 230, and one or more I/O interfaces 240. The processor 210 may comprise one or more microcontrollers or execution units to perform various control operations in response to executing one or more instructions of a software and/or firmware routine. The volatile memory 220 may include one or more volatile memory devices such as random access memory, storage buffers, and cache memory to store instructions and data in a non-persistent manner. The non-volatile memory 230 may include one or more volatile memory devices such as read only memory devices, flash memory device, and/or other storage devices to store instructions and/or data in a persistent manner.

The I/O interfaces 240 may include one or more interfaces via which the transmission control module 150 may send and receive signals. In one embodiment, the I/O interface 240 includes a vehicle network interface as well as one or more general I/O connections. The vehicle network interface permits the transmission control module 150 to send and receive messages via the vehicle network 180. The general I/O connections permit the transmission control module 150 to be hard-wired to one or more sensors and/or components of the vehicle 100 in order to directly send and/or receive signals to and/or from such aspects of the vehicle 100.

An operator of the vehicle 100, via the operator controls 190, may request the vehicle controller 160 to configure the engine 110 as well as the propulsion assemblies 120, 130 for a particular mode of operation. In one embodiment, the operator controls 190 include one or more mode selectors such as buttons, touch screens, switches, dials, etc. which may be manually actuated by the operator in order to request the vehicle controller 160 to place the amphibious vehicle 100 in the corresponding operating mode. For example, the mode selectors 192 may include a land button, a transition both button, a transition jets only button, a transition tracks only button, and a water button which the operator may press in order to request the vehicle controller 160 to respectively place the vehicle 100 in a land mode, a transition both mode, a transition jets only mode, a transition tracks only mode, and a water mode.

In response to such requests from the operator controls 190, the vehicle controller 160 may generate control signals to place the vehicle 100 in the selected operating mode. In particular, the vehicle controller 160 may generate control signals which request the engine control unit 140 to configure the engine 110 for the selected mode of operation. In one embodiment, the engine control unit 140 generates one or more control signals which adjust the output power of the engine. In particular, the engine control unit 140 configures the engine 110 to produce a high output power (e.g. 2700 horsepower (Hp)) in response to the vehicle controller 160 requesting water power, to produce a low output power (e.g. 850 Hp) having an output power lower than the water power in response to the vehicle controller requesting land power, and to produce an intermediate output power (e.g. 1609 Hp) that is between the water power and the land power in response to the vehicle controller 160 requesting transition power.

As explained in more detail below, water power is generally associated with water mode, land power is generally associated with land mode, and transition power is generally associated with one of the transition modes (e.g. both, jets only, and tracks only). However, in one embodiment, the engine 110 is dynamically configured to generate land power when in transition modes that power the land propulsion assembly (e.g. transition both mode and transition tracks only mode) if land use is detected.

Besides controlling the engine output, the vehicle controller 160 may also configure other aspects of the vehicle 100 in order to configure the vehicle 100 for the selected operating mode. For example, the vehicle controller 160 may generate signals which result in the water propulsion assembly 120 lowering sleds or skis upon which the vehicle 100 may hydroplane when in water mode. Similarly, the vehicle controller 160 may generate signals which result in the water propulsion assembly 120 raising the sleds when in land mode or the transition modes. Likewise, the vehicle controller 160 may generate signals which result in the power transfer module 112 driving water turbines of the water propulsion assembly 120 and disengaging the transmission assembly 116 when in water mode or transition jets only mode. Conversely, the vehicle controller 160 may generate signals which result in the power transfer module 112 driving the transmission assembly 116 and land propulsion assembly 130 and disengaging turbines of the water propulsion assembly 120 when in a land mode or transition tracks only mode.

As noted above, the operator controls 190 permits an operator to manually select among the various modes of operation. During normal operation, the operator selects water mode when the vehicle is traveling over water, land mode when the vehicle is traveling over land, and one of transition modes when the vehicle is transitioning between water and land. The operator may drive the vehicle over land while in the transition both mode or transition tracks only mode. However, supplying transition power to the transmission 116, land propulsion assembly 130, and/or other land mode components of the vehicle for extended periods while driving over land may result in excessive wear and potentially early failure of such components due to the substantially higher torque of the transition power (e.g. 1609 Hp) compared to the lower torque of the land power (e.g. 850 Hp).

Figure 3:
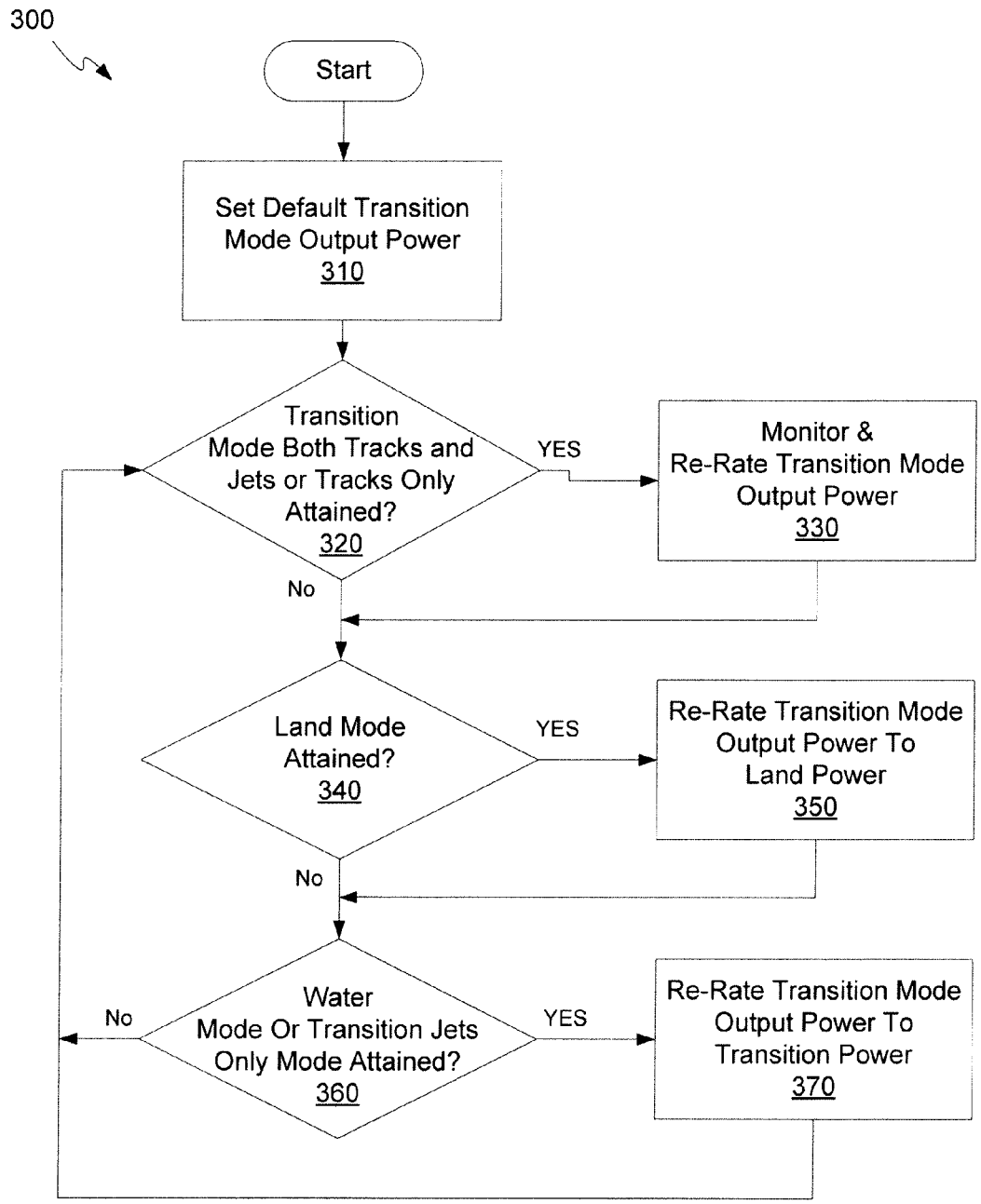
FIG. 3 shows an embodiment of a method for re-rating transition output power of the engine shown in FIG. 1.

Accordingly, in one embodiment, the transmission control module 150 automatically determines while in a transition mode that drives the land propulsion assembly whether the vehicle 100 is on land and generates signals which request the vehicle controller 160 and/or the engine control unit 140 to configure the engine to produce land power instead of transition power. Referring now to FIG. 3, an embodiment of a method 300 for automatically switching between transition power and land power is shown. In one embodiment, the volatile memory 220 and/or non-volatile memory 230 of the transmission control module 150 includes software and/or firmware instructions which in response to being executed by the processor 210 of the transmission control module 150 results in the transmission control module 150 controlling the vehicle 100 per the method 300. In other embodiments, the method 300 may be implemented via another component of the vehicle 100 such as, for example, the vehicle controller 160, engine control unit 140, and/or another control module of the vehicle 100.

At block 310, the transmission control module 150 defines a default engine power output for the transition modes. In particular, the transmission control module 150 defaults the engine power output for the transition modes to land power. More specifically, the transmission control module 150 in one embodiment sets a default TRANSITION MODE POWER CHANGE REQUEST message to a COMMAND LAND POWER IN TRANSITION MODE ACTIVE message. The transmission control module 150 in response to certain conditions may request the vehicle controller 160 to change the transition mode output power by broadcasting the currently defined TRANSITION MODE POWER CHANGE REQUEST message upon the vehicle network 180.

At block 320, the transmission control module 150 determines based upon various signals received from sensors 170 whether to automatically re-rate the transition mode engine output power while in one of the transition modes that drive the land propulsion assembly 130. As noted above, the vehicle 100 may support three transition modes. In particular, the vehicle may support a transition jets only mode in which the power transfer module assembly 112 drives the water propulsion assembly 120 but not the transmission assembly 116. The vehicle 100 may also support a transition both mode in which the power transfer module assembly 112 drives the water propulsion assembly 120 and the transmission assembly 116. The vehicle 100 may further support a transition tracks only mode in which the power transfer module assembly 112 drives the transmission assembly 116 but not the water propulsion assembly 120.

Thus, the transmission control module 150 in one embodiment determines whether to automatically re-rate the transition mode output power based at least upon receipt of either a TRANSITION BOTH MODE ATTAINED message or a TRANSITION TRACKS ONLY MODE ATTAINED message from the vehicle controller 160. In another embodiment, the transmission control module 150 may further determine whether to automatically re-rate the transition mode output power based upon signals received from the sensors 170. In particular, the transmission control module 150 in one embodiment may determine to automatically re-rate the transition mode output power in response to receiving either a TRANSITION BOTH MODE ATTAINED message or a TRANSITION TRACKS ONLY MODE ATTAINED message and determining based upon sensor signals that (a) the torque converter 114 is transferring torque to the transmission assembly 116, and (b) the engine speed is greater than an engine speed re-rate threshold.

Thus, if the transmission control module 150 determines that the vehicle has attained a transition mode that drives the land propulsion assembly 130, the torque converter 114 is supplying power to the transmission assembly 116, and the engine speed is great enough, then the transmission control module 150 proceeds to block 330 to further monitor operation of the vehicle 100 and determine whether to adjust the transition mode output power based upon whether the vehicle is traversing water or land. If any of the above conditions are not met, then the transmission assembly 116 is not excessively powered because either (i) the engine 110 is not supplying excessive power to the power transfer module assembly 112, and/or (ii) the torque converter 114 of the power transfer module assembly 112 is not transferring such power to the transmission assembly 116.

In response to determining to automatically re-rate the transition mode output power, the transmission control module 150 at block 330 monitors vehicle operation and re-rates the transition mode output power based upon the monitored operation. As explained below in regard to the re-rate method 400 of FIG. 4, the transmission control module 150 at block 330 may determine whether the vehicle 100 is or is not traversing land and may re-rate or re-define the TRANSITION MODE POWER CHANGE REQUEST message accordingly. For example, if the transmission control module 150 determines that the vehicle 100 is not traversing land then the transmission control module 150 may set and broadcast a TRANSITION MODE POWER CHANGE REQUEST message of COMMAND LAND POWER IN TRANSITION MODE NOT ACTIVE. Conversely, if the transmission control module 150 determines that the vehicle 100 is traversing land then the transmission control module 150 may set and broadcast a TRANSITION MODE POWER CHANGE REQUEST message of COMMAND LAND POWER IN TRANSITION MODE ACTIVE.

In one embodiment, the vehicle controller 160 receives the TRANSITION MODE POWER CHANGE REQUEST messages and in turn may request the engine control unit 140 to change the engine output power to the requested transition mode output power when placing the vehicle 100 in a transition mode. In another embodiment, the engine control unit 140 receives the TRANSITION MODE POWER CHANGE REQUEST messages from the transmission control module 150 and acts upon the message. In some embodiments, the vehicle controller 160 and/or the engine control unit 140 may elect to ignore the change request if certain predefine conditions are satisfied.

In response to determining not to dynamically re-rate the transition mode output power, the transmission control module 150 at block 340 may determine whether the vehicle 100 has attained land mode. In one embodiment, an operator may manually select land mode via the operator controls 190. In response to such a selection, the vehicle controller 160 may configure the vehicle for land mode and may broadcast a LAND MODE ATTAINED message upon the vehicle network 180 after attaining land mode. Accordingly, the transmission control module 150 may determine that the vehicle 100 has attained land mode based upon whether the LAND MODE ATTAINED message has been received. As discussed above, the engine 110 produces land power (e.g. 850 Hp) when in land mode. However, in response to attaining land mode, the transmission control module 150 proceeds to block 350 to re-rate the transition mode engine output for land use in anticipation of the operator later manually selecting a transition mode via the operator controls 190.

At block 350, the transmission control module 150 may re-rate the transition mode engine output for land use. In particular, the transmission control module may set the TRANSITION MODE POWER CHANGE REQUEST message to a COMMAND LAND POWER IN TRANSITION MODE ACTIVE message and broadcast the set TRANSITION MODE POWER CHANGE REQUEST message on the vehicle network 180 to inform the vehicle controller 160 of the appropriate transition mode output power.

If the transmission control module 150 determined that the land mode as not been attained, then the transmission control module 150 at block 360 may determine whether the vehicle 100 has attained the water mode or the transition jets only mode. In one embodiment, an operator may manually select the water mode or transition jets only mode via the operator controls 190. In response to such a selection, the vehicle controller 160 may respectively configure the vehicle 100 for water mode or transition jets only mode by broadcasting either a WATER MODE ATTAINED message or a TRANSITION JETS ONLY MODE ATTAINED message upon the vehicle network 180 after attaining the selected mode. Accordingly, the transmission control module 150 may determine that the vehicle 100 has attained the water mode or the transition jets only mode based upon the received messages. If the water mode or transition jets only mode has been attained, then the transmission control module 150 may proceed to block 370 to re-rate the transition mode output power for water use. Otherwise, the transmission control module 150 may return to block 320 to determine whether to monitor vehicle operation and to automatically re-rate the transition mode output power due to the vehicle 100 being in a transition mode that powers the land propulsion assembly 130.

Figure 4:
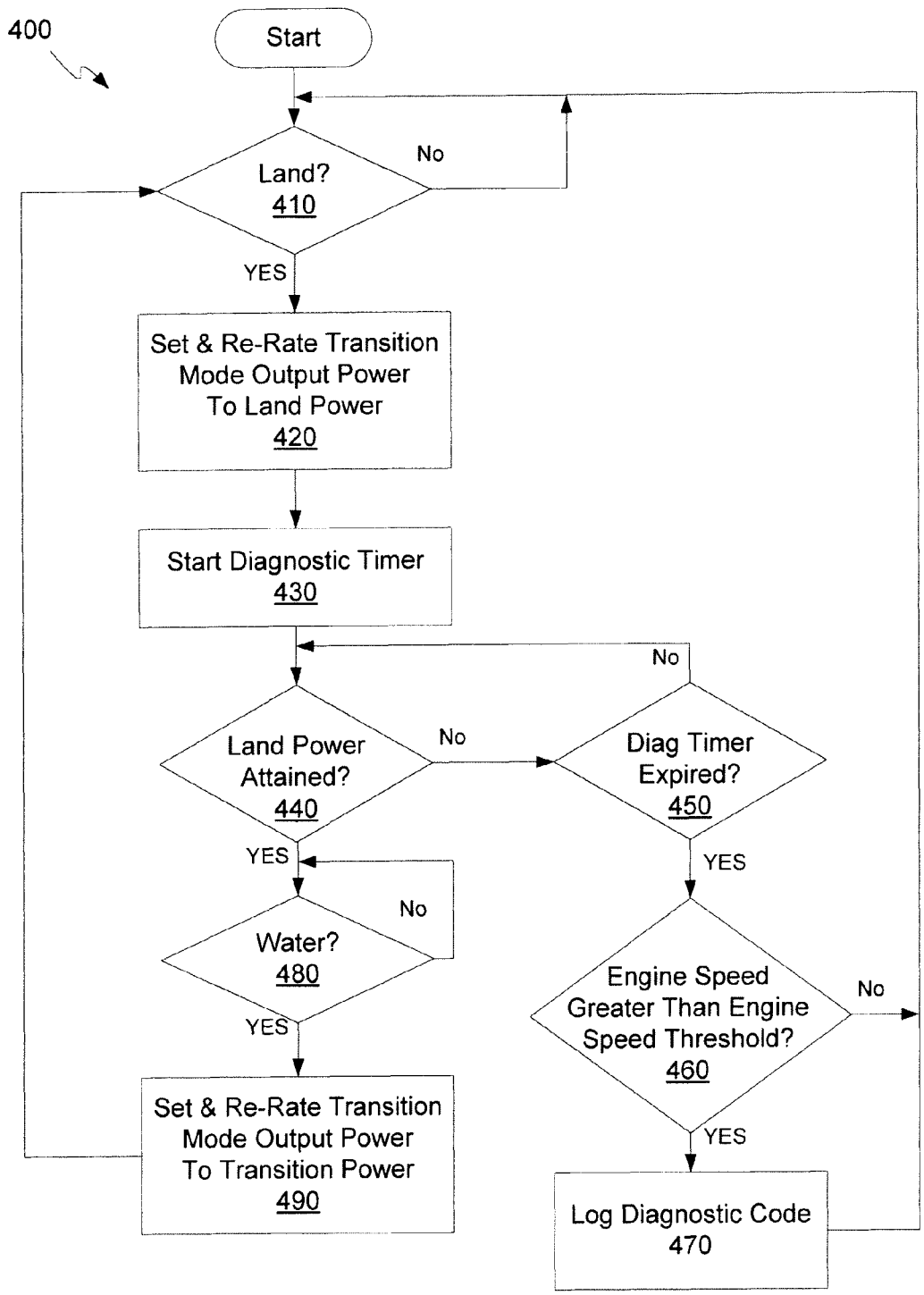
FIG. 4 shows an embodiment of a method for automatically re-rating the transition output power of the engine based upon determining whether or not the vehicle is traversing over land.

Referring now to FIG. 4, further details regarding one embodiment of the method 400 for automatic re-rating the transition mode output power is shown. As indicated above, the transmission control module 150 may perform the method 400 of FIG. 4 in response to executing software and/or firmware routines. As shown, the transmission control module 150 at block 410 may continue to monitor the operation of the vehicle 100 until it determines based upon signals received from sensors 170 that the vehicle 100 is traversing over land. In response to determining that the vehicle is traversing over land, the transmission control module 150 at block 420 may re-rate and set the transition mode output power to land power. In particular, the transmission control module 150 may define the transition mode output power by setting the TRANSITION MODE POWER CHANGE REQUEST message to a COMMAND LAND POWER IN TRANSITION MODE ACTIVE message and broadcasting the set TRANSITION MODE POWER CHANGE REQUEST message. The vehicle controller 160 in response to receiving such a change request message may send a change request for land power to the engine control unit 140.

The transmission control module 150 may then determine whether the engine 110 switches to land power within a predetermined or programmed diagnostic time period. To this end, the transmission control module 150 at block 430 starts a diagnostic timer and at block 440 determines whether the engine 110 is producing the requested land power. In one embodiment, the engine control unit 140, the engine 110 and/or the vehicle controller 160 generates a LAND MODE POWER ATTAINED message to indicate that the engine 110 is producing land power. Accordingly, the transmission control module 150 may determine whether the engine 110 is producing the requested land power based upon receipt of the LAND MODE POWER ATTAINED message. If land power is attained, then the transmission control module 150 may proceed to block 480 to determine whether the vehicle 100 is traversing across water. Otherwise, the transmission control module 150 may proceed to block 450 to determine whether the diagnostic timer has expired.

If the diagnostic timer has not expired, then the transmission control module 150 may return to block 440 to again determine whether the engine 110 has attained the requested land power. However, if the diagnostic timer has expired, then the transmission control module 150 at block 460 may determine based upon signals from sensors 170 whether the engine speed is greater than a specified engine speed threshold $THR_E$. If the engine speed is greater than the engine speed threshold, then the transmission control module 150 may log a diagnostic code to indicate that the vehicle 100 failed to attain the requested land power and may return to block 410 to determine whether the vehicle is still traversing across land. If the engine speed is not greater than the engine speed threshold, the transmission control module 150 may still return to block 410 but without logging a diagnostic code. In one embodiment, the engine speed threshold is set such that the engine 110 does not subject the transmission 116 and other land propulsion components to more torque than such components are designed to handle. Accordingly, the transmission control module 150 elects not to log a diagnostic code since the transmission and other components have not been subjected to more torque than they were designed to handle. In one embodiment, the engine speed threshold $THR_E$ may be programmed to a value between 0 and roughly 8200 RPM (Revolutions Per Minute) with a default value of 1700 RPM.

At block 480, the transmission control module 150 may continue to monitor the operation of the vehicle 100 until it determines based upon signals received from sensors 170 that the vehicle 100 is traversing over water. In response to determining that the vehicle 100 is traversing over water, the transmission control module 150 at block 490 may re-rate and set the transition mode output power to transition power. In particular, the transmission control module 150 may define the transition mode output power by setting the TRANSITION MODE POWER CHANGE REQUEST message to a COMMAND LAND POWER IN TRANSITION MODE NOT ACTIVE message and broadcasting the set TRANSITION MODE POWER CHANGE REQUEST message. The vehicle controller 160 in response to receiving such a change request message may send a change request for transition power to the engine control unit 140.

In one embodiment, the transmission control module 150 continues to monitor operation of the vehicle 100 under the re-rate method 400 until the vehicle 100 attains the water mode, land mode, or transition jets only mode as a result of the operator manually selecting such modes via the operator controls 190. At which point, the transmission control module 150 returns to the method 300 of FIG. 3.

Figure 5:
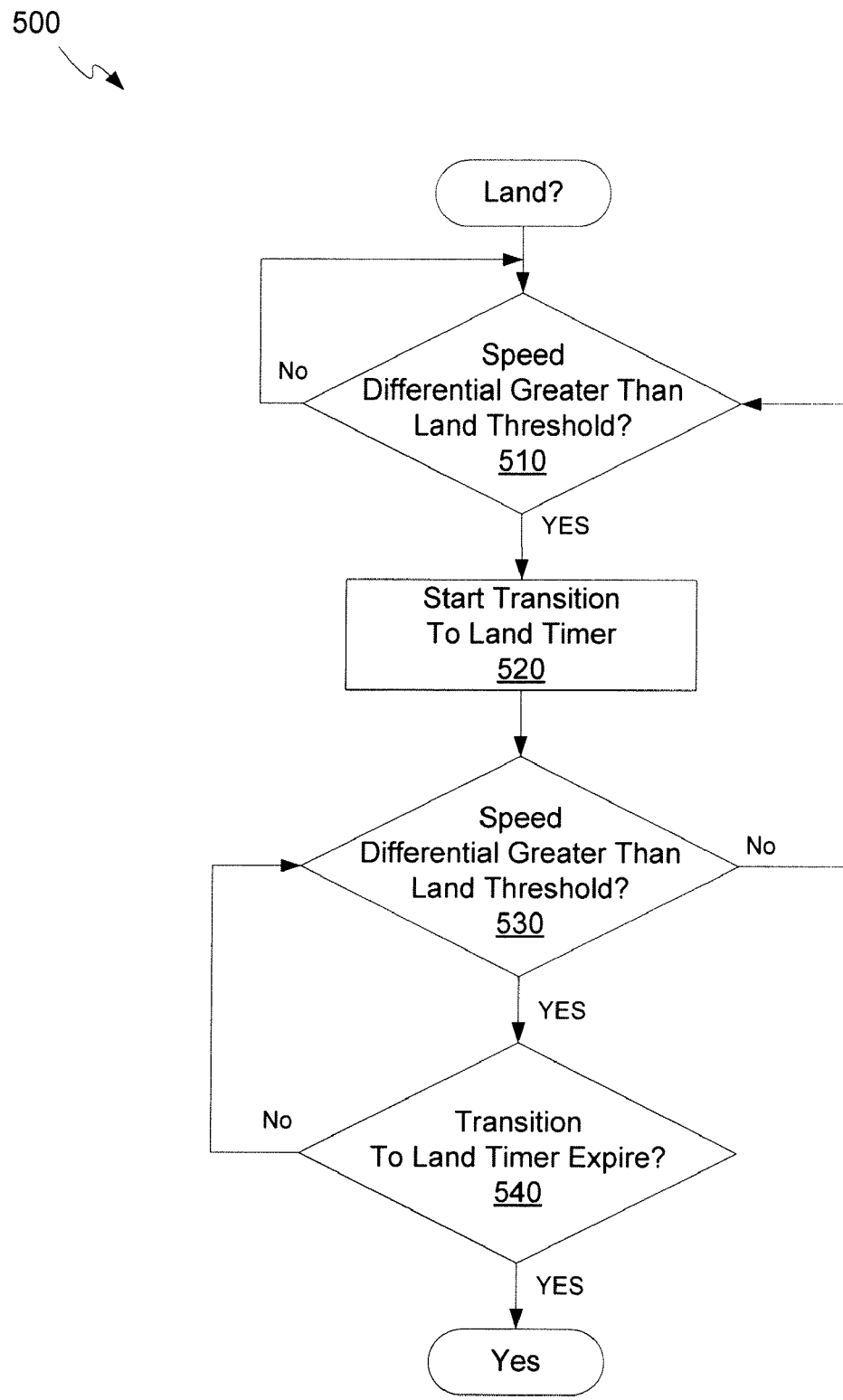
FIG. 5 shows an embodiment of a method for detecting whether the vehicle is traversing over land.

Referring now to FIG. 5, one embodiment of a method 500 for determining whether the vehicle 100 is traversing over land is shown. The method 500 may be utilized by the transmission control module 150 to implement block 410 of the re-rate method 400. The transmission control module 150 per the method 500 may determine whether a speed differential between the engine 110 and a turbine speed of the torque converter 114 within the PTM assembly 112 is greater than a specified speed differential threshold $THR_L$ for at least a specified period of time $TP_{T2L}$. To this end, the transmission control module 150 at block 510 may determine based upon signals received from sensors 170 whether the differential between the engine speed and the turbine speed is greater than the specified speed differential threshold $THR_L$. If the transmission control module 150 determines that the speed differential is greater than the speed differential threshold $THR_L$, then the transmission control module 150 may start a transition-to-land timer at block 520 and proceeds to block 530. At blocks 530 and 540, the transmission control module 150 may continue to monitor the speed differential until the transition-to-land power timer expires.

When in transition mode and traversing across land, the speed differential is greater than when traversing across water. Accordingly, the speed differential threshold $THR_L$ may be set to a level which when exceeded by the speed differential is indicative of the vehicle 110 traversing over land. In one embodiment, the speed differential threshold $THR_L$ may be programmed to a value between 0 and roughly 8200 RPM with a default value of 400 RPM. Moreover, the time period $TP_{T2L}$ of the transition-to-land power timer may be preset or programmed to a value of sufficient length to prevent inadvertently switching from transition power to land power due momentary increases in the speed differential which are not indicative of the vehicle 100 moving over land. In one embodiment, the time period $TP_{T2L}$ may be programmed to a value between 0 and 64 seconds with a default value of 500 milliseconds (msec).

Figure 6:
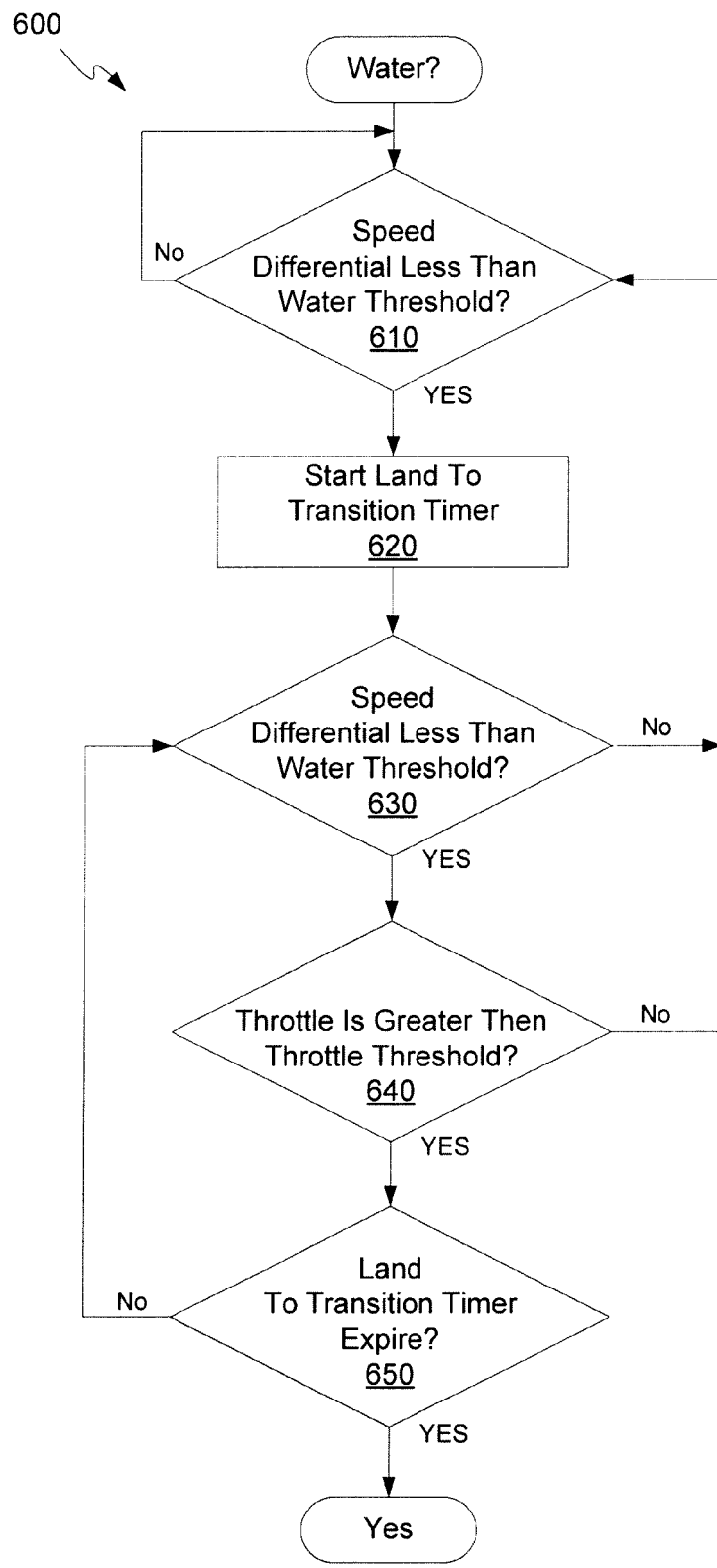
FIG. 6 shows an embodiment of a method for detecting whether the vehicle is traversing over water.

Referring now to FIG. 6, one embodiment of a method 600 for determining whether the vehicle 100 is traversing over water is shown. The method 600 may be utilized by the transmission control module 150 to implement block 480 of the re-rate method 400. The transmission control module 150 per the method 600 may determine whether a speed differential between the engine 110 and a turbine speed of the torque converter 114 of the PTM assembly 112 is less than a speed differential threshold $THR_W$ for at least a specified period of time $TP_{L2T}$ and that the throttle is greater than a throttle threshold $THR_{TH}$ during the specified time period $TP_{L2T}$.

To this end, the transmission control module 150 at block 610 may determine based upon signals received from sensors 170 whether the differential between the engine speed and the turbine speed is less than the specified speed differential threshold $THR_W$. If the transmission control module 150 determines that the speed differential is less than the speed differential threshold $THR_W$, then the transmission control module 150 may start a land-to-transition power timer at block 620 and proceed to block 630. At blocks 630, 640, and 650, the transmission control module 150 may continue to monitor the speed differential and the throttle until the land-to-transition power timer expires.

When in transition mode and traversing across water, the speed differential is generally less than when traversing across land. Accordingly, the speed differential threshold $THR_W$ may be set to a level which when not exceeded by the speed differential is indicative of the vehicle 110 traversing over water. Moreover, the speed differential also generally decreases when the throttle decreases and the vehicle is moving down a grade. Accordingly, the transmission control module 150 at block 640 may ensure the throttle 194 remains above the throttle threshold $THR_{TH}$ to make sure the reduced speed differential is indicative of traversing across water instead of moving down a grade on land thus to be fooled by forcing Transition Power when the vehicle is actually still on land. In one embodiment, the speed differential threshold $THR_W$ may be programmed to a value between 0 and roughly 8200 RPM with a default value of 300 RPM. Moreover, the throttle threshold may be programmed to a value between 0 and 100% with a default value of 25%. Further, the time period $TP_{L2T}$ of the land-to-transition power timer may be preset or programmed to a value of sufficient length to prevent inadvertently switching from land power to transition power due momentary decreases in the speed differential which are not indicative of the vehicle 100 moving over water. In one embodiment, the time period $TP_{L2T}$ of the land-to-transition power timer may be programmed to a value between 0 and 64 seconds with a default value of 5 seconds.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

What is claimed is:

1. A method of an amphibious vehicle having a water propulsion assembly and a land propulsion assembly, comprising
    placing an amphibious vehicle in a transition mode of operation in which the engine drives at least the land propulsion assembly, the transition mode defining a reference transition output power to be produce by an associated engine while in the transition mode,
    requesting an engine of the amphibious vehicle to produce the transition output power in response to determining that the amphibious vehicle is not traversing land, and
    requesting the engine of the amphibious vehicle to produce land output power that is lower than the transition output power in response to determining that the amphibious vehicle is traversing land.

2. A method of an amphibious vehicle having a water propulsion assembly and a land propulsion assembly, comprising
    placing an amphibious vehicle in a transition mode of operation in which the engine drives at least the land propulsion assembly,
    requesting an engine of the amphibious vehicle to produce transition output power in response to determining that the amphibious vehicle is not traversing land,
    determining that the amphibious vehicle is traversing land based upon a speed differential between a sensed turbine speed of a torque converter and a sensed engine speed, and
    requesting the engine of the amphibious vehicle to produce land output power that is lower than the transition output power in response to determining that the amphibious vehicle is traversing land.

3. The method of claim 1, further comprising determining that the amphibious vehicle is traversing land in response to determining that a speed differential between a sensed turbine speed of a torque converter and a sensed engine speed exceeds a specified speed differential threshold.

4. The method of claim 1, further comprising determining that the amphibious vehicle is traversing land in response to determining that a speed differential between a sensed turbine speed of a torque converter and a sensed engine speed has exceeded a speed differential threshold for a specified time period.

5. The method of claim 1, further comprising determining that the amphibious vehicle is traversing land in response to determining that a speed differential between a sensed turbine speed of a torque converter and a sensed speed of the engine has exceeded a specified speed differential for a specified time period.

6. The method of claim 1, further comprising
determining that the amphibious vehicle is traversing land in response to determining that a speed differential between a sensed turbine speed of a torque converter and a sensed speed of the engine has exceeded a first specified speed differential for a first specified time period, and
determining that the amphibious vehicle is not traversing land in response to determining that the speed differential between the sensed turbine speed of the torque converter and the sensed speed of the engine is less than a second specified speed differential for a second specified time period.

7. The method of claim 6, wherein the first specified speed differential is greater than the second specified speed differential.

8. The method of claim 7, wherein the first specified time period is less than the second specified time period.

9. The method of claim 6, wherein the first specified speed differential, the second specified speed differential, the first specified time period, and the second specified time period are programmable.

10. A control module for an amphibious vehicle having an engine, sensors, a water propulsion assembly and a land propulsion assembly, the control module comprising
one or more memory device to store a plurality of instructions,
an interface to communicatively couple the control module to sensors and other components of the amphibious vehicle, and
a processor, that in response to executing the plurality of instructions stored in the one or more memory devices, automatically determines whether the engine is to produce transition power or land power based upon whether signals received from the sensors of the amphibious vehicle indicate the amphibious vehicle is traversing land, and transmits a change engine output request via the interface in response to determining engine output power is to be switched between transition power and land power,
wherein the transition power is a reference power to be produced by the engine while the amphibious vehicle is in a transition mode of operation.

11. The control module of claim 10, wherein the plurality of instructions further result in the processor requesting the engine of an amphibious vehicle to produce transition power in response to determining that the amphibious vehicle is not traversing land, and requesting the engine of the amphibious vehicle to produce land power that is lower than the transition output power in response to determining that the amphibious vehicle is traversing land.

12. A control module for an amphibious vehicle having an engine, sensors, a water propulsion assembly and a land propulsion assembly, the control module comprising
one or more memory device to store a plurality of instructions,
an interface to communicatively couple the control module to sensors and other components of the amphibious vehicle, and
a processor, that in response to executing the plurality of instructions stored in the one or more memory devices, (i) determines that the amphibious vehicle is traversing land based upon a speed differential between a sensed turbine speed of a torque converter and a sensed speed of the engine, (ii) automatically determines whether the engine is to produce transition power or land power based upon whether signals received from the sensors of the amphibious vehicle indicate the amphibious vehicle is traversing land, and (iii) transmits a change engine output request via the interface in response to determining engine output power is to be switched between transition power and land power.

13. The control module of claim 11, wherein the plurality of instructions further result in the processor determining that the amphibious vehicle is traversing land in response to determining that a speed differential between a sensed turbine speed of a torque converter and a sensed engine speed exceeds a specified speed differential threshold for a specified time period.

14. The control module of claim 11, wherein the plurality of instructions further result in the processor
determining that the amphibious vehicle is traversing land in response to determining that a speed differential between a sensed turbine speed of a torque converter and a sensed speed of the engine has exceeded a first specified speed differential for a first specified time period, and
determining that the amphibious vehicle is not traversing land in response to determining that the speed differential between the sensed turbine speed of the torque converter and the sensed speed of the engine is less than a second specified speed differential for a second specified time period.

15. An amphibious vehicle, comprising
operator controls which permit an operator to select at least a water mode of operation and a transition mode of operation, wherein the water mode of operation defines a reference water output power to be produced by an associated engine and the transition mode of operation defines a reference transition output power to be produce by the associated engine,
an engine to selectively produce water power in response to the water mode of operation, and either transition power or land power in response to the transition mode of operation,
a water propulsion assembly coupled to the engine via a power transfer module, the water propulsion assembly to propel the amphibious vehicle across water,
a land propulsion assembly coupled to the engine via a transmission and the power transfer module, the land propulsion assembly to propel the amphibious vehicle across land,
a transmission control module to control operation of the transmission and to request the engine to produce land power during the transition mode of operation if the transmission control module determines that the amphibious vehicle is traversing land.

16. The amphibious vehicle of claim 15, wherein the transmission control module requests the engine to produce transition power in response to determining that the amphibious vehicle is not traversing land, and requests the engine of the amphibious vehicle to produce land power that is lower than the transition output power in response to determining that the amphibious vehicle is traversing land.

17. The amphibious vehicle of claim 16, wherein the transmission control module determines that the amphibious vehicle is traversing land based upon a speed differential between a sensed turbine speed of a torque converter and a sensed speed of the engine.

18. The amphibious vehicle of claim 16, wherein the transmission control module determines that the amphibious vehicle is traversing land in response to determining that a speed differential between a sensed turbine speed of a torque converter and a sensed engine speed exceeds a specified speed differential threshold for a specified time period.

19. The amphibious vehicle of claim 16, wherein the transmission control module
  determines that the amphibious vehicle is traversing land in response to determining that a speed differential between a sensed turbine speed of a torque converter and a sensed speed of the engine has exceeded a first specified speed differential for a first specified time period, and
  determines that the amphibious vehicle is not traversing land in response to determining that the speed differential between the sensed turbine speed of the torque converter and the sensed speed of the engine is less than a second specified speed differential for a second specified time period.

20. The amphibious vehicle of claim 16, further comprising a throttle, wherein
  determines that the amphibious vehicle is traversing land in response to determining that a speed differential between a sensed turbine speed of a torque converter and a sensed speed of the engine has exceeded a first specified speed differential for a first specified time period and the throttle exceeds a throttle threshold, and
  determines that the amphibious vehicle is not traversing land in response to determining that the speed differential between the sensed turbine speed of the torque converter and the sensed speed of the engine is less than a second specified speed differential for a second specified time period.

* * * * *